United States Patent [19]

Elikan et al.

[11] 4,292,278
[45] Sep. 29, 1981

[54] PURIFICATION OF WET PROCESS PHOSPHORIC ACID AS A PRETREATMENT STEP IN THE RECOVERY OF URANIUM

[75] Inventors: Leonard Elikan; Regis R. Stana; Robert W. Ritchey, all of Lakeland, Fla.

[73] Assignee: Wyoming Mineral Corp., Lakewood, Colo.

[21] Appl. No.: 13,700

[22] Filed: Feb. 21, 1979

[51] Int. Cl.³ .......................................... C01B 25/235
[52] U.S. Cl. ........................................ 423/8; 423/3; 423/10; 423/321 R; 423/321 S
[58] Field of Search ................ 423/8, 9, 10, 3, 321 R, 423/321 S

[56] References Cited

U.S. PATENT DOCUMENTS

| | | | |
|---|---|---|---|
| 2,830,872 | 4/1958 | McCullough | 423/10 |
| 2,859,092 | 11/1958 | Bailes et al. | 423/7 |
| 3,711,591 | 1/1973 | Hurst et al. | 423/10 |
| 3,835,214 | 9/1974 | Hurst et al. | 423/10 |
| 3,969,476 | 7/1976 | Lucas et al. | 423/9 |
| 4,087,512 | 5/1978 | Reese et al. | 423/321 R |

OTHER PUBLICATIONS

Hurst et al., "Recovery of Uranium from Wet-Process Phosphoric Acid", *Ind. Eng. Chem. Process Des. Develop.*, vol. 11, No. 1 (1972) pp. 122-128.

*Primary Examiner*—Deborah L. Kyle
*Attorney, Agent, or Firm*—D. P. Cillo

[57] ABSTRACT

A metal containing acidic solution, also containing humic acid impurities and contaminants, is purified by contacting the acidic solution with a scrubbing agent consisting essentially of a metal extractant and from about 50 vol.% to about 90 vol.% of a hydrocarbon, where the scrubbing agent interacts with impurities and contaminants in the acidic solution to form a sludge phase which is removed and a purified acid phase which can be fed into a metal recovery process.

7 Claims, 3 Drawing Figures

PURIFICATION OF WET PROCESS PHOSPHORIC ACID AS A PRETREATMENT STEP IN THE RECOVERY OF URANIUM

BACKGROUND OF THE INVENTION

Commercially available wet process phosphoric acids are generally manufactured from either calcined rock or uncalcined rock. Calcining decomposes and drives off the organic matter in the rock, and the phosphoric acid product made by dissolving it, known as green acid, contains almost no suspended organic solids. When uncalcined rock is digested, considerable amounts of organic compounds are dissolved from the phosphate rock and remain as both soluble and insoluble impurities in the product acid, known as "black" or "brown" acid. The organic compounds in the acid are commonly referred to as humic acids or humic compounds.

Uranium and other metals can be recovered from this commercial grade wet process phosphoric acid. Such recovery processes, directed primarily to uranium, are taught by Bailes and Long, in U.S. Pat. No. 2,859,092, and by Hurst and Crouse, in U.S. Pat. Nos. 3,711,591 and 3,835,214, relating to reductive stripping and oxidative stripping respectively, all herein incorporated by reference.

The main purpose in mining phosphate rock has been to produce fertilizer. As an initial step in making fertilizer, the concentrated and milled phosphate rock is reacted with sulfuric acid under constant and intensive agitation, to produce a phosphoric acid solution and an insoluble calcium sulfate. A simple form of the reaction is expressed as follows:

$$2Ca_3(PO_4)_2 + 6H_2SO_4 + 12H_2O = 4H_3PO_4 + 6CaSO_4 \cdot 2H_2O$$

The wet process phosphoric acid solution, formed as shown above, generally contains about 600 grams/liter of $H_3PO_4$, and as impurities about 0.2 gram/liter of uranium, about 1 gram/liter of calcium, about 9 grams/liter of iron, about 28 grams/liter of sulfate and about 30 grams/liter of fluorine, with varying amounts of arsenic, magnesium, aluminum, and substantial amounts of humic acids. This metal containing acidic solution can be processed to remove the valuable uranium. For example, the solution of phosphoric acid can serve as the aqueous feed in a liquid-liquid solvent extraction process of uranium recovery.

To make the metal recovery process viable, however, it is necessary that the acidic solution be highly purified, in order to control sludge emulsion formation in the solvent extraction mixer-settlers used in the metal recovery process. This sludge problem, caused by the humic acids, was recognized by Hurst and Crouse in U.S. Pat. No. 3,711,591.

Reese et al., in U.S. Pat. No. 4,087,512, attempted to solve problems of uranium extraction emulsions and sludge formation, caused by humic acids in the wet process phosphoric acid feed, by a pretreatment with a hydrocarbon at between 55° C. to 70° C. The volume ratio of acid:hydrocarbon was as high as 30:1 and was preferably 2:1. The useful hydrocarbons used by Reese et al. included kerosine, gasoline, benzene and toluene. After the acid and the hydrocarbon were mixed, they were transferred to a separator with a conical bottom. After 5 to 10 minutes, the mixture separates into a hydrocarbon phase, composed of hydrocarbon, emulsified solid organic materials and some captured phosphoric acid, and a purified heavier bottom aqueous phase, composed of phosphoric acid. The bottom aqueous phase is drawn from the conical bottom of the separator. The entire top hydrocarbon phase overflows the top of the separator into a settling chamber for further separation. Such a process, involving interaction of wet process phosphoric acid solely with a kerosene type hydrocarbon introduces considerable complexity into the process in that a separate solvent loop is required for the cleanup and circulation of the scrubbing agent. Also such an approach has not been found effective in removing a major portion of the humic acid over an extensive time period.

What is needed is a pretreatment process to purify metal containing acidic solutions, by removing substantially all of the organic humic acids, which form sludge or emulsions at the phase interfaces during solvent extraction in metal recovery processes. The pretreatment process must be low in capital cost, and should result in low operating costs and operator attention. The method must provide for getting the humic solids out of the settler in a convenient fashion and must avoid emulsion when the scrubbing agent is recycled to the pretreatment, or elsewhere in the process.

SUMMARY OF THE INVENTION

A new and useful process has been discovered to inexpensively purify metal containing acidic solutions such as wet process phosphoric acid. This process, where humic acids are scrubbed, i.e., substantially removed from acidic solutions, can be used as a pretreatment step in an extraction process for recovering uranium from phosphoric acid solutions. This process should be useful for both oxidative extraction-reductive strip and reductive extraction-oxidative strip methods of recovering uranium.

The pretreatment process involves contacting and interacting the sludge forming impurities in the acid with a scrubbing agent, consisting essentially of a metal extractant and from about 50 vol. % to about 90 vol. % of a solvent. It is believed that the combination, two component scrubbing agent modifies the sludge forming materials physically rather than chemically, by interacting to form coagulating colloids. The hydrocarbon solvent useful in this invention is preferably a product of distillation of petroleum, having a boiling point of between about 150° C. and 300° C., and can be, preferably, a refined kerosine. The kerosine, preferably contains primarily aliphatic hydrocarbons ranging from about $C_{12}$ to about $C_{18}$. The metal extractant is a mixture of, preferably, di (2-ethylhexyl) phosphoric acid (D2EHPA) and trioctyl phosphine oxide (TOPO) where the mole ratio of D2EHPA:TOPO is from about 3 to 5:1. The organic impurities in the phosphoric acid, which are transferred to the scrubbing agent phase, are removed from the settler of the scrubbing stage with the scrubbing agent. After these organic impurities have been removed from the scrubbing agent, the scrubbing agent can be recycled to the scrubbing stage or can be sent on to be contacted with phosphoric acid solutions in other parts of the uranium recovery process without formation of emulsions. The phosphoric acid which leaves this pretreatment stage, can be contacted with solvent over a wide concentration range of aqueous-to-organic ratios without forming sludge emulsions.

In one embodiment of the process, aqueous, oxidized phosphoric acid, substantially free of inorganic solids, is mixed with a scrubbing agent consisting essentially of a kerosine solution of D2EHPA:TOPO. The volume ratio of acid-scrubbing agent is preferably between about 1:1 to 3. The mixture is fed, preferably at a high flow rate, to a prescrub mixer-settler. The organic impurities in the aqueous phosphoric acid solution interact with the scrubbing agent and are modified so that they are transferred from the aqueous phase to the scrubbing agent. Upon settling, the aqueous purified acid phase disengages from the scrubbing agent and the impurities. This purified acidic solution can then be used as feed in a uranium separation process. The scrubbing agent-impurities phase is quasi-stable and after overflowing the settler to an organic clarifier, separates into a clear D2EHPA:TOPO-kerosine solution phase and a sludge phase. The use of oxidized phosphoric acid, and a combination D2EHPA:TOPO-kerosine scrubbing agent, removes up to five times more sludge in the pretreatment stage than use of kerosine alone. This combination D2EHPA:TOPO-kerosine in many cases is used as the extractant in the uranium recovery process and can easily be fed to the pre-scrubber from the first extraction step.

BRIEF DESCRIPTION OF THE DRAWINGS

For a better description of the invention reference may be made to the preferred embodiments exemplary of the invention, shown in the accompanying drawings, in which.

DESCRIPTION OF THE PREFERRED EMBODIMENTS

Figure 1:
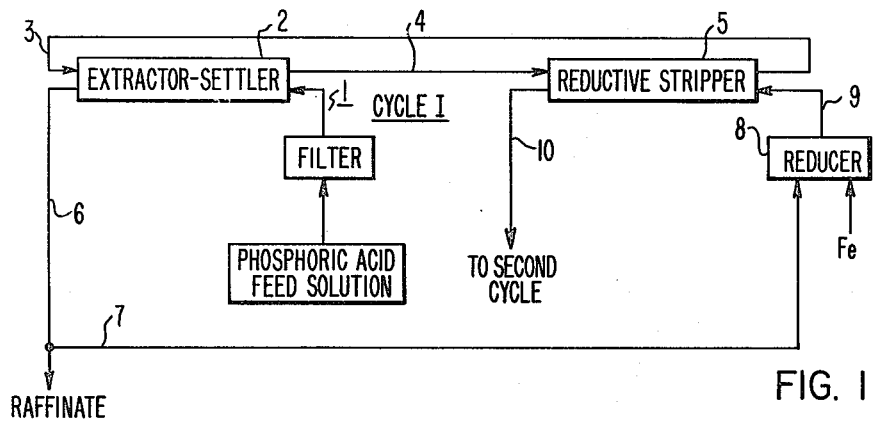
FIG. 1 is a flow diagram, illustrating one example of a prior art process for the stripping of uranium form a phosphoric acid feed, using a filter pretreatment.

Referring to FIG. 1 of the drawings, a method of extracting metal from an acidic solution is shown, more specifically, the process involves one type of process for the extraction of uranium from 30% $H_3PO_4$. In Cycle I, filtered and purified phosphoric feed acid from line 1 enters extractor-settler means 2, which may contain 1 to 4 stages. This feed is typically a 35° C. to 50° C. aqueous 5 M to 6 M solution of phosphoric acid having a pH of up to about 1.5 and containing about 0.05 to about 0.5 g/l of uranium (generally as the uranyl ion, $UO_2^{+2}$). In the process shown, the phosphoric acid may be oxidized before entering the extractor-settler by any suitable means, to ensure that the uranium is in the +6 oxidation state, i.e., uranyl ion. In the extractor-settler, the feed acid is contacted by mixing with a water-immiscible, organic extractant composition from line 3. The extractant solvent composition contains a reagent dissolved in a hydrocarbon diluent such as kerosine. The reagent extracts the uranyl ions to form a uranium complex soluble in the organic solvent.

Typically, the solvent composition from line 3 is added in a 0.6 to 1 phosphoric feed acid to solvent composition ratio (by volume). The solvent composition from line 3 can contain, for example, about 0.2 to 0.7 mole of a dialkyl phosphoric acid having about 4 to 12 carbon atoms in each chain, preferably di (2-ethylhexyl) phosphoric acid (D2EHPA-reagent) per liter of solvent. The solvent also contains about 0.025 to about 0.25 mole of a synergistic agent well known in the art, for example, a tri alkyl phosphine oxide, where the alkyl chains are linear having from 4 to 10 carbon atoms, preferably tri octyl phosphine oxide (TOPO) per liter of solvent. These synergistic agents allow reduction of equipment size while increasing uranium extraction. The usual mole ratio of D2EHPA:TOPO is from about 3 to 5:1. The D2EHPA exists as the dimer $H([CH_3(CH_2)_7]_2PO_4)_2$. Two dimers react with a uranyl ion to form the complex $UO_2H_2([CH_3(CH_2)_7]_2PO_4)_4$, denoted herein as U-D2EHPA.

In the solvent extraction step in the extractor-settler 2, if the aqueous phosphoric feed acid solution contains suspended solids, humic matter, or supersaturated salts, an emulsion will form at the interface between the solvent phase and the aqueous phase. This emulsion is a severe process nuisance which hinders the normal coalescense in the extractor-settlers, ties up the expensive D2EHPA-TOPO-kerosine solvent and results in D2EHPA-TOPO-kerosine solvent loss when the sludge is removed from the extractor-settlers. Generally, sludge formation in the extractor-settler means 2, which may be a bank of up to 4 units, is from about 2 to 20 cu. ft./1,000 gallons of phosphoric feed acid solution. Removal of the sludge at this stage of the process causes uneconomical solvent and acid losses.

The solvent composition, containing complexed uranium and contaminates, passes through line 4 to reductive stripper means 5, which may contain 1 to 4 stages, to strip uranium from the organic solvent. A portion of the raffinate from extractor 2 passes through lines 6 and 7 to reducer 8 where iron (Fe°) is added to reduce ferric ions to ferrous ion. The ferrous ion enters reductive stripper 5 by line 9 and is oxidized there to the ferric ion, while reducing the uranyl ion to the quadravalent $U^{+4}$ ion. The $U^{+4}$ ion enters the aqueous stream strip solution in line 10. The organic solvent leaving the stripper is then recycled through line 3 to extractor 2.

Finally, the $U^{+4}$ ion in the strip solution in line 10 is oxidized to the uranyl ion in oxidizer 11, to enable the uranium to be extracted again in Cycle II. The product from Cycle I contains phosphoric acid and typically has a pH of about 1 to 4. It contains about 25 g/l to 40 g/l of iron, about 5 g/l to 15 g/l of uranium, and other contaminating cations including Group II and III metal ions and rare earths.

Figure 2:
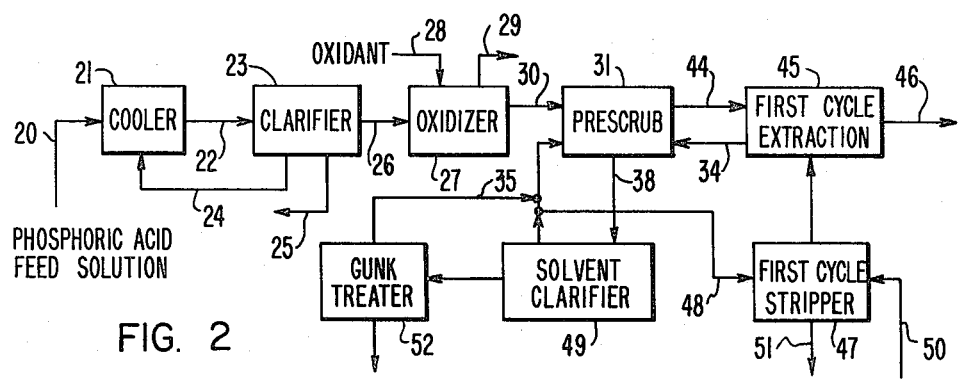
FIG. 2 is a flow diagram, illustrating one embodiment of the purification and sludge removal process of this invention.

As a method of purifying a metal containing acidic solution also containing humic acids, and as pretreatment, before the feed acid enters line 1 of FIG. 1, the feed acid can be reacted according to the flow diagram of FIG. 2. In the preferred method of metal containing solution pretreatment, shown in FIG. 2, hot, aqueous, wet process phosphoric acid 20, containing humic acids, supersaturated salts and a wide variety of other sludge forming contaminants is preferably cooled, as an optional first step. The cooling can be accomplished by any suitable means, such as a flash cooler, spray cooler or heat exchanger 21, from a temperature of about 70° C. to a temperature of about 40° C. The cooled, 30% acid stream 22 is then preferably fed into a clarifier 23, to settle and reduce the solids content. Solids recycle stream 24 and solids bleed stream 25 are also shown.

The cooled, low solids, 30% phosphoric acid stream 26 is then preferably fed into an optional oxidation means 27, where the phosphoric acid is oxidized with a suitable oxidizing agent from stream 28. If an oxidation extraction is being employed, it is advantageous to oxidize the phosphoric acid at this point, since oxidation substantially enhances sludge removal at the prescrub stage. Also, when the phosphoric acid is oxidized before prescrubbing, temperatures as low as 25° C. can be used in the prescrubber. Off gases may be exited through stream 29.

Figure 3:
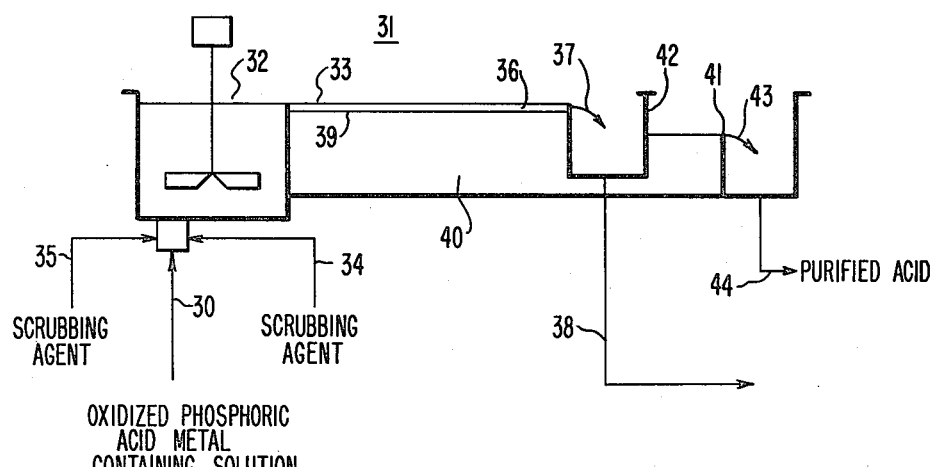
FIG. 3 is a flow diagram of one type of prescrub mixer-settler that can be used in the method of this invention.

The metal containing acidic solution, in this case the 30% phosphoric acid containing oxidized uranium from stream 30, is then fed, at a temperature of between about 25° C. to 40° C., into the purification prescrubbing means 31. The scrubber 31 is a combination mixer-settler means. Referring now to FIG. 3, the mixer portion of the scrubber-purification means is shown as 32 and the settler portion is shown as 33. As shown in this preferred embodiment, oxidized phosphoric acid from stream 30 is fed into the prescrub mixer 32, as well as scrubbing agent. The scrubbing agent can comprise a first cycle extraction scrubbing agent from stream 34 and clarified scrubbing agent recycled to the prescrubber from the solvent clarifier and gunk treater via stream 35.

The volume ratio of metal containing acidic solution, such as phosphoric acid:scrubbing agent will be between about 1:0.5 to 10 but is preferably between about 1:1 to 3. Usually, for 1 volume from stream 30 there will be about 1 to 2 volumes from clarified recycle stream 35 and about 0.5 to 1 volume from extraction stream 34. It should be understood that the metal containing acidic solution can be scrubbed with scrubbing agent from a separate source not related to a uranium or other metal stripping operation.

The scrubbing agent is a mixture of metal extractant and hydrocarbon solvent. The metal extractant must have a low solubility (less than about 1,000 ppm.) in the acidic solution. It must also have the ability to form a metal derivative or complex between itself and the metal ion which is being extracted. It must also be soluble in the hydrocarbon solvent. It will generally possess at least one ionizable hydrogen. The hydrocarbon solvent must have a low viscosity and limited solubility of up to about 10 vol. % in the acidic solution. The extractant and extracted metal value must be soluble in it.

The metal extract can be a mixture of di-alkyl phosphoric acid:tri alkyl phosphine oxide, in a mole ratio of from about 3 to 5:1. The di-alkyl phosphoric acid can have from 4 to 12 carbon atoms in the alkyl group and is preferably di (2-ethylhexyl) phosphoric acid (D2EHPA). The tri alkyl phosphine oxide can have from 4 to 10 carbon atoms in a linear alkyl chain and is preferably tri octyl phosphine (TOPO). Other metal extractant combinations can be used depending on the metals contained in the acidic solution.

The hydrocarbon is a liquid having a boiling point of over about 70° C. Preferably, the hydrocarbon will have a boiling point over about 125° C. The hydrocarbon must be essentially immiscible with the metal containing solution such as the hot phosphoric acid, and have a substantially zero extraction coefficient for the metal containing solution. The preferred hydrocarbons are refined, high boiling, high flash point, aliphatic or aliphatic-aromatic solvents. The most useful hydrocarbon is a product of distillation of petroleum having a boiling point of between about 150° C. and about 300° C., and can be, preferably, a refined kerosine.

The scrubbing agent must contain from about 50 vol. % to about 90 vol. % hydrocarbon solvent-diluent, and about 10 vol. % to about 50 vol. % metal extractant, such as a mixture of di-alkyl phosphoric acid and trialkyl phosphine oxide. Over 90 vol. % hydrocarbon, sludge forming ability is decreased and the feed from first cycle extraction cannot be used. Under 50 vol. % hydrocarbon, the stripping mixture becomes very viscous causing phase separation problems.

In the mixer 32, the organic impurities in the aqueous phosphoric acid solution are contacted by the dual component combination scrubbing agent. The humic acids, as well as some inorganic solids contained in the acids, interact with the combination scrubbing agent and are modified to form a scrubbing agent-impurities emulsion phase known as sludge. Gunk solids in this scrubbing agent-impurities phase shown as 36 are about 2% to 10%.

The pre-scrub settler 33 can operate at high flow rates, between about 1,000 to about 4,000 liters per minute, and with a high acid/scrubbing agent-impurities interface, so that the scrubbing agent-impurities phase 36 will continuously overflow the settler at point 37 and exit the settler as stream 38. The emulsion phase 36 can also be allowed to build up and be removed periodically at point 37. Stream 38 then is fed to a solvent clarifier and gunk treatment means, to remove impurities and clarify and recover scrubbing agent, to provide a purified scrubbing agent which may then be recycled into the prescrub mixer 32 as stream 35. This process provides for removal of humic solids from the settler, and avoids emulsion when the scrubbing agent or purified phosphoric acid is recycled or used in other parts of the process.

The high acid/emulsion interface 39, which keeps the scrubbing agent-impurities phase floating on top of the purified acid 40, is accomplished by adjusting the flow rate of the mixed acid and scrubbing agent and raising the acid overflow weir 41 at the end of the settler. This keeps the emulsion from flowing under the scrubbing agent weir box 42 and exiting the settler with the acid. This also prevents buildup of gunk solids at the acidorganic interface. The thickness ratio in the settler of the emulsion scrubbing agent-impurities phase:purified acidic phase is maintained at from about 1:2 to 10, by the flow rate of mixed acid and scrubbing agent into the settler. The 1:2 ratio may be reached when gunk emulsion is removed periodically rather than continuously. The purified phosphoric acid, still containing a variety of metals including uranium, exits the prescrubber over the acid overflow weir at 43, and exits as stream 44. Stream 44 can then be fed to a first cycle extraction means, shown as 45 in FIG. 2. It can be contacted with solvent over a wide concentration range of aqueous-to-organic ratios without forming sludge emulsions. Also shown in FIG. 2 is the raffinate stream 46 from the extractor 45, the first cycle stripper 47, the pregnant scrubbing agent stream 48 recycled from the solvent clarifier 49, the strip acid feed stream 50, the strip acid product stream 51 and the gunk treatment means 52.

EXAMPLE 1

Referring to FIG. 2 of the drawings, fresh, hot, commercial grade wet process, aqueous, phosphoric acid (30% $P_2O_5$; sp. gr.=1.36), containing humic acids, supersaturated salts, and about 0.2 gram/liter of uranium along with various other impurities, was fed at a rate of 4 gpm, into a surge tank cooling means with a cooling coil where it was cooled from 62° C. to 43° C. The cooled aqueous phosphoric acid was then fed into an 84 inch diameter clarifier to settle and reduce solids content from about 1 wt.% to 0.05 wt.%. Then the overflow, low solids, wet process, aqueous, phosphoric acid was fed at 43° C. into an oxidizer, where it was ozidized.

A portion of the oxidized phosphoric acid was then fed into a 1 sq. ft. scrubber-settler unit and mixed with a scrubbing agent. The scrubbing agent consisted of 21 vol. % of a 4:1 mole ratio mixture of di (2-ethylhexyl) phosphoric acid:trioctylphosphine oxide and 79 vol. % of kerosine solvent. The kerosine had a boiling point of between 210° to 230° C. and a specific gravity of 0.79. The scrubbing agent was fed into the scrubber at 41° C. The scrubbing agent flow rate was 1.24 gal/min. and the aqueous phosphoric acid feed flow rate was 0.62 gal/min., providing an acid:scrubbing agent volume ratio of 1:2 and allowing organic phase continuous operation. The scrubber-settler unit was maintained at a temperature of 40° C.

Solids formed in the scrubber-settler from interaction of the impurities in the aqueous acid with the scrubbing agent became a part of the scrubbing agent phase. This scrubbing agent phase was withdrawn as shown in FIG. 3 of the drawings, leaving a purified phosphoric acid phase. The scrubbing agent was clarified and returned to the scrubber-settler. A sample of the sludge was centrifuged in a clincial centrifuge (30 sec. spin at 1750 rpm.) for determination of additional scrubbing agent recovery, and the waxy sludge was analyzed and then discarded. The sludge contained 62.8 vol. % scrubbing agent, 15.2 vol. % wax, 21.6 vol. % acid and 0.4 vol. % white gypsum solids. The total sludge formation was about 67 lb. dry solids/1,000 gal. of phosphoric feed acid.

In order to determine if this process would purify the phosphoric acid sufficiently to prevent sludge formation in the extractor-settlers used in uranium recovery process, the purified phosphoric acid described above was fed into an extractor-settler in a process similar to Cycle I of FIG. 1 in the drawings.

The phosphoric feed acid solution was fed at 41° C. from the purification-pretreatment stage into an extractor-settler, where it mixed with a water-immiscible, organic solvent-acid composition containing 0.5 mole of di-2-ethylhexyl phosphoric acid (D2EHPA) and 0.125 mole of tri-n-octylphosphine oxide per 1 liter of kerosine as solvent. The volume rates of feed phosphoric acid: solvent-acid composition mixing in the extractor-settler was about 2:1.

A 9 mesh Tyler screen was used to remove the sludge from the extractor-settler, and the volume of screened sludge was measured in a graduated cylinder. The sludge formation rate from the scrubbed phosphoric acid was only 1.75 cu. ft./1,000 gal. phosphoric feed acid. This showed that the purification process was extremely effective in removing humic matter, supersaturated salts and other impurities in the process phosphoric acid.

This purification step was seen as an extremely useful substitute for maintenance-intensive filters and other methods previously used in clarifying phosphoric feed acid for uranium recovery processes.

For comparative purposes, a similar pre-scrub operation was performed, except that in one run, the phosphoric acid was not oxidized before pre-scrub, and in the second run, 100% kerosine was used as the scrubbing agent for oxidized and non-oxidized acid. In the case where the acid was not oxidized, the sludge formation was about 22 lb. dry solids/1,000 gal. of phosphoric acid feed. In the case where the acid was oxidized before pre-scrub but 100% kerosine was used as the scrubbing agent, the sludge formation was about 25 lb. dry solids/1,000 gal. of phosphoric acid feed. In the case where the acid was not oxidized and 100% kerosine was used as the scrubbing agent, the sludge formation was about 8.3 lb. dry solids/1,000 gal. of phosphoric acid feed, compared to 67 lb. dry solids/1,000 gal. of phosphoric feed acid using oxidized acid and D2EHPA:-TOPO-kerosine, as described above.

We claim:

1. A method of removal of humic acid impurities from a metal containing acidic solution also containing humic acid impurities, as a pretreatment in a metal recovery process, comprising the steps of:
(1) mixing the humic acid containing acidic solution with a scrubbing agent in a mixer-settler means, the scrubbing agent consisting essentially of:
   (a) an organic, metal extractant material that has low solubility in the acidic solution, and is effective to form a metal derivative with metal ions in the acidic solution, and
   (b) an organic hydrocarbon solvent for the metal extract material, said hydrocarbon solvent having a boiling point of over about 70° C., a limited solubility in the acidic solution, and comprising from about 50 vol. % to about 90 vol. % of the scrubbing agent, where the scrubbing agent is interactive with the humic acid impurities, and is added in an amount effective to scrub the humic acid impurities from the acidic solution; where after mixing, the acid and scrubbing agent flow at a high rate into the settler, forming a mixture consisting of a scrubbing agent-impurities sludge phase and a purified acidic solution phase, where the sludge phase forms on top of the purified acidic solution phase, where the flow rate of the mixed acid and scrubbing agent into the settler is such that the thickness ratio of the top sludge phase:bottom purified acidic phase is maintained at from about 1:2 to 10,
(2) removing the scrubbing agent-impurities sludge phase, and then
(3) passing the purified acidic solution phase into a metal extraction means.

2. In the method of claim 1, where before contact with scrubbing agent, the metal containing acidic solution is oxidized with an oxidizing agent, wherein the volume ratio of acidic solution:scrubbing agent is between about 1:0.5 to 10, flow into the settler is between about 1,000 liters per minute to about 4,000 liters per minute, and the sludge is continuously removed in step (2).

3. A method of removal of humic acid impurities from a uranium containing wet process phosphoric acid solution also containing humic acid impurities, as a pretreatment in a uranium recovery process, comprising the steps of:
(1) oxidizing the humic acid containing phosphoric acid solution with an oxidizing agent,
(2) mixing the oxidized humic acid containing phosphoric acid solution with a scrubbing agent in a mixer-settler means, the scrubbing agent consisting essentially of:
   (a) an organic metal extractant consisting essentially of a mixture of:
     (i) dialkyl phosphoric acid having from 4 to 12 carbon atoms in the alkyl group, and (ii) trialkylphosphine oxide having from 4 to 10 carbon atoms in the alkyl group, where the mole ratio of dialkyl-phosphoric acid:trialkylphosphine oxide is from about 3 to 5:1, and (b) an organic hydrocarbon solvent for the metal extractant, said hydrocarbon solvent having a boiling point of over about 70° C., a limited solubility in the phosphoric acid, and comprising from about 50 vol. % to about 90 vol. % of the scrubbing agent, where the scrubbing agent is interactive with the humic acid impurities, and is added in an amount effective to scrub the humic acid impurities from the phosphoric acid solution; where after mixing, the acid and scrubbing agent flow at a high rate into the settler, forming a mixture consisting of a scrubbing agent-impurities sludge phase and a purified acid solution phase, where the sludge phase forms on top of the purified acidic solution phase, where the flow rate of the mixed acid and scrubbing agent into the settler is such that the thickness ratio of the top sludge phase:bottom purified acidic phase is maintained at from about 1:2 to 10, (3) removing the scrubbing agent-impurities sludge phase, and then (4) passing the purified acidic solution phase into a uranium extraction means, where the purified acidic solution can be contacted with solvent over a wide concentration range without forming sludge emulsions.

4. The method of claim 2, wherein the organic hydrocarbon solvent has a boiling point of between about 150° C. and about 300° C., as an initial step, before contact with scrubbing agent, the wet process phosphoric acid is oxidized by an oxidizing agent comprising nitric acid, the volume ratio of phosphoric acid:scrubbing agent is between about 1:1 to 3, flow into the settler is between about 1,000 liters per minute to about 4,000 liters per minute, the sludge is continuously removed in step (3), the scrubbing agent-impurities sludge phase is clarified to remove impurities and provide a purified scrubbing agent recycle.

5. The method of claim 2, wherein the organic hydrocarbon solvent is kerosine.

6. The method of claim 2, wherein the dialkylphosphoric acid is di (2-ethylhexyl) phosphoric acid and the trialkylphosphine oxide is trioctylphosphine oxide.

7. The method of claim 2, wherein the volume ratio of phosphoric acid:scrubbing agent is between about 1:0.5 to 10.

* * * * *